United States Patent
Sherman

(10) Patent No.: US 9,107,220 B1
(45) Date of Patent: Aug. 11, 2015

(54) METHOD FOR PRACTICING CARRIER SENSE MULTIPLE ACCESS AT THE APPLICATION LAYER

(71) Applicant: BAE SYSTEMS Information and Electronic Systems Integration Inc., Nashua, NH (US)

(72) Inventor: Matthew J. Sherman, Succasunna, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 233 days.

(21) Appl. No.: 13/742,610

(22) Filed: Jan. 16, 2013

Related U.S. Application Data

(60) Provisional application No. 61/587,403, filed on Jan. 17, 2012.

(51) Int. Cl.
  *H04W 74/08* (2009.01)
  *H04W 72/00* (2009.01)
  *H04W 24/02* (2009.01)
  *H04L 12/413* (2006.01)

(52) U.S. Cl.
  CPC ......... *H04W 74/0808* (2013.01); *H04L 12/413* (2013.01); *H04W 72/005* (2013.01); *H04W 24/02* (2013.01)

(58) Field of Classification Search
  None
  See application file for complete search history.

(56) References Cited

U.S. PATENT DOCUMENTS

| | | | |
|---|---|---|---|
| 5,659,881 A * | 8/1997 | Kent | 455/520 |
| 2003/0161340 A1 * | 8/2003 | Sherman | 370/445 |
| 2007/0118742 A1 * | 5/2007 | Abhishek et al. | 713/160 |
| 2007/0293218 A1 * | 12/2007 | Meylan et al. | 455/434 |
| 2008/0002734 A1 * | 1/2008 | Zheng et al. | 370/445 |
| 2010/0016023 A1 * | 1/2010 | Yamauchi et al. | 455/562.1 |
| 2010/0142463 A1 * | 6/2010 | Hu | 370/329 |

OTHER PUBLICATIONS

L. Kleinrock, and F. A. Tobagi, "Packet Switching in Radio Channels: Part I-Carrier Sense Multiple-Access Modes and Their Throughput-Delay Characteristics," IEEE Transactions on Communications, vol. COM-23, No. 12, Dec. 1975.

* cited by examiner

*Primary Examiner* — Michael Thier
*Assistant Examiner* — Yaotang Wang
(74) *Attorney, Agent, or Firm* — Sand & Sebolt; Daniel J. Long

(57) ABSTRACT

A system and method for controlling a radio transmitter from the application layer is presented. The method includes monitoring an uplink state of a shared channel at a cell manager and processing the uplink state, at least in part, in the application layer in the cell manager to produce processed uplink state. The processed uplink state is then broadcast in a control packet on a downlink of the shared channel to a subscriber manager. The processed uplink state is then further processed, at least in part, at the application layer in the subscriber manager to produce transmitter control data. The transmitter control data is then used control the radio transmitter.

20 Claims, 4 Drawing Sheets

METHOD FOR PRACTICING CARRIER SENSE MULTIPLE ACCESS AT THE APPLICATION LAYER

CROSS REFERENCE TO RELATED APPLICATION

This application claims priority from U.S. Provisional Patent Application Ser. No. 61/587,403, filed Jan. 17, 2012; the disclosure of which is incorporated herein by reference.

BACKGROUND

1. Field of Invention

The current invention relates generally to apparatus, systems and methods for radio communication. More particularly, the apparatus, systems and methods relate controlling radio communication. Specifically, the apparatus, systems and methods provide for controlling radio communication at the application layer.

2. Description of Related Art

Many communication radios are designed to be point-to-point or use multiple access methods that do not permit carrier sense multiple access (CSMA) to be applied. CSMA and other standards can allow radios to share channels that otherwise could not be shared. Normally substantial radio changes are required to permit CSMA to be implemented. This is because many of the parameters used to implement CSMA have to be determined fast in hardware in the lower levels such as the MAC and PHY. For example, selecting carrier frequency, enabling and disabling the transmitter, selecting a transmitter center frequency, controlling some queues (flushing, prioritizing queuing of control packets, controlling queue status indicators), determining receive signal strength (RSSI) and the carrier lock indicator (CLI), are usually at least partially performed in lower layers. Many of these controls and values require precise timing that can often only be achieved with dedicated hardware at the MAC and/or PHY layers. In order to create a radio the shares multiple channels across multiple radios a new radio would have to be designed from the PHY level on up requiring the original radio to be designed to implement CSMA or another algorithm for sharing channels. What is needed is a better way of implementing channel capabilities in radios.

SUMMARY

The preferred embodiment of the invention can be configured as a method for controlling a radio transmitter from the application layer is presented. The method includes monitoring an uplink state of a shared channel at a cell manager. The cell manager processes the uplink state, in the application layer in the cell manager to produce processed uplink state. The processed uplink state is then broadcast in a control packet on a downlink of the shared channel to a subscriber manager. The processed uplink state is next further processed at the application layer in the subscriber manager to produce transmitter control data. The transmitter control data is then used control the radio transmitter. As mentioned above, this method provides for controlling radios from the application layer to share radio resources that otherwise could not be shared. The method assumes key parameters and controls from the lower layers of the radio and router are available at the application layer. As mentioned earlier, sensing the uplink channel state in the cell manager and processing before sending it on to the downlink to the subscriber managers allows the subscriber radio that may only have FDD capability to be controlled so that its transmitter does not unnecessarily interfere with the shared channel.

For example, the cell manager and the subscriber manager can implement a "virtual" CSMA protocol. By monitoring the channel state at the receiving end and feeding back the channel state to the other side of the link it is possible for the "virtual" version of the CSMA protocol to be implemented. Many communication radios are designed to be point to point or use multiple access methods that do not permit carrier sense multiple access (CSMA) to be applied. CSMA can allow radios to share channels that otherwise could not be shared. Normally substantial radio changes are required to permit CSMA to be implemented. However, if sufficient facilities exist in a radio, it is possible to implement a form of CSMA with application layer software. Such facilities do commonly exist. The application layer software would not require precise timing, and could even be implemented external to the radio in some cases. The method involved is advantageous because it allows a channel to be shared by several radios where otherwise the channel could not have been shared.

The preferred embodiment is a radio system configured to operate on a shared channel. The radio system includes a first radio that is base station (BS), a second radio with a transmitter. This configuration also includes a cell manager configured to operate in the application layer and to provide control and management (C&M) on a downlink (DL) of the shared channel. The radio system includes a subscriber manager configured to operate in the application layer. The subscriber manager is configured to determine the capabilities of the second radio, acquire the DL, receive C&M messages on the DL and to provide C&M traffic on an uplink (UL) of the shared channel. A router is configured to route data to the subscriber manager before any data is routed to the second radio for transmission. The subscriber manager is configured to determine, at least in part, at the application layer when to turn on the transmitter in the radio for the transmission of data. In other configurations of this embodiment, the cell manager, subscriber manager and router may be configured to perform other functions and services in the application layer.

Another configuration of the preferred embodiment is a method of controlling a first radio at the application layer of the Open Systems Interconnection 7-layer mode of the International Organization for Standardization (IOS). The method provides to the application layer parameters associated with a shared channel to be shared with a second radio. Based, at least in part, on the application layer parameters, the method controls from the application layer when the first radio is to access the shared channel. In other embodiments of this method can provide to the application layer one or more of a carrier lock indicator (CLI) value, a receive signal strength indicator (RSSI) value, a collision detection value, a signal to noise ratio (SNR) value of a media and an uncorrected error value of the media, a transmitter.

In another configuration, the method can provide carrier sense multiple access (CSMA) capability to FDD radios that does not have an ability to receive on an uplink by controlling from the application layer according to a CSMA protocol that is discussed in detail later. The method monitors with a cell manager an uplink link that the first radio transmits on to determine if the uplink is active. An indication if the uplink is active is forwarding on a down link from the cell manager to the first radio. The method then determines whether to transmit from the first radio on the uplink based, at least in part, on the indication if the uplink is active.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 illustrates a configuration of the preferred embodiment as a method for controlling a radio transmitter from the application layer.

Similar numbers refer to similar parts throughout the drawings.

DETAILED DESCRIPTION

As discussed in the background section, historically shared channel radios have been designed with dedicated hardware in the lower levels such as the PHY and MAC so that values and controls used to control access to the shared channels could be rapidly calculated. Therefore, it would be expensive and difficult to rebuild legacy radios that could not share channel into radios that could share channels with other radios. However, improvements in radio design and the logic used in radios has now enabled the preferred embodiment of this invention that allows radios to implement channel sharing from the application level. For example, the preferred embodiment of the invention implements a form of Carrier Sense Multiple Access (CSMA) with application layer software. CSMA is one of several well known protocols for channel sharing. The application layer software/logic used to implement CSMA would not require precise timing, and could even be implemented external to a radio in some cases. The preferred embodiment is advantageous because it allows a channel to be shared by several radios where otherwise the channel could not have been shared by a radio not implemented with the preferred embodiment. Additionally, by implementing CSMA at the application layer it is possible for the channel to be shared without modifying existing radio software. However and as discussed in more detail below, the radio must provide certain facilities such as the ability to turn on and off the transmitter and monitor parameters such as "carrier lock" from the application layer. Many radios provide this. Finally, some radios cannot listen to the channels they transmit on such as in frequency domain duplexed (FDD) systems.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 1:
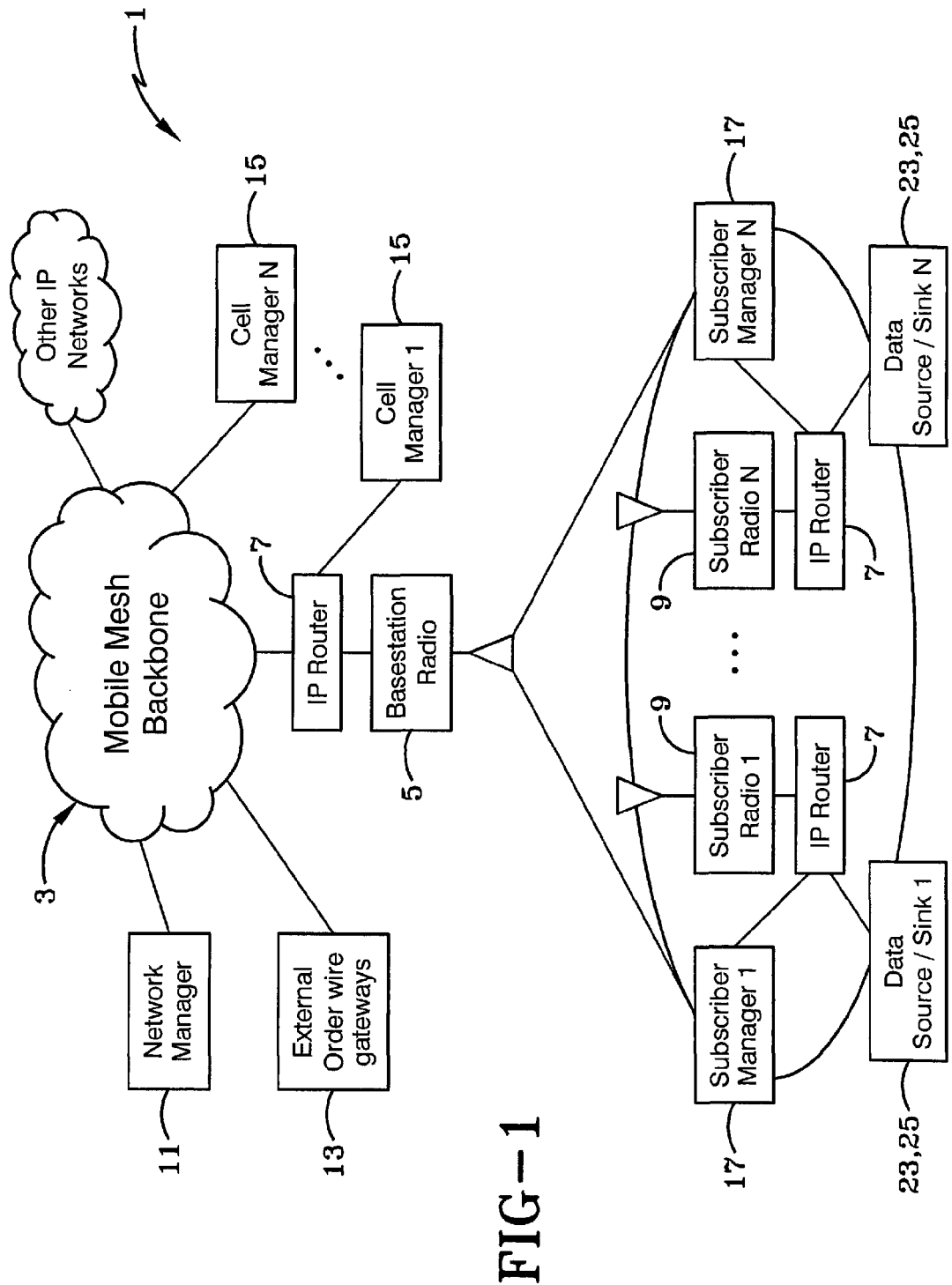
FIG. 1 illustrates a radio system reference architecture that may implement the preferred embodiment.

A typical radio system reference architecture 1 that may implement the preferred embodiment is illustrated in FIG. 1. Operation over a mobile mesh backbone network (MMBN) 3 with connectivity to other IP networks may be required in some implementations (military, disaster recovery, etc). However more traditional backbone networks such as used in cellular systems can also be used. In the architecture, Point to Multipoint (PMP) basestations 5 (similar to WiMAX and LTE) provide access to users associated with the basestation (BS), the MMBN and IP connectivity to other IP networks. An IP router 7 would need to be associated with the BS 5 to control traffic on the downlink, and access to the MMBN. Subscriber stations (SS) 9 would be used to access the services available from the BS 5. Handoff and mobility could be supported using existing cellular techniques. However the cause of handoffs could include mobility of both the SS 9 and the BS 5. While not explicitly required, a network manager (NM) 11, potentially distributed across multiple entities, is desirable.

In addition, support for external orderwires 13 may be included. For instance, some radios may be receive only and would require an external order wire 13 to request download of specific content. This can also facilitate use of the uplink channel when longer uploads are contemplated. The orderwire 13 could be an external cellular or even a military push to talk radio with a human operators providing the orders. However, this preferred embodiment is primarily focused on the protocol between the BS and SS and assumes standard facilities for network management and external orderwires are provided. The radio system architecture can also include one or more data sources 23 and or data sinks 25.

Any radio that defines an appropriate interface, for instance, through a management information base (MIB) accessible by a protocol such as simple network management protocol (SNMP) with appropriate capabilities accessible at the application layer can implement the preferred embodiment. Some examples of such radio systems are Common Data Link (CDL) and MIL-STD-188-165A (165A). Other LOS and SATCOM could also apply this protocol. The underlying nature of the radios is largely transparent to the method described. For instance, a radio network could be Time Domain Duplexed (TDD) or Frequency Domain Duplexed (FDD) in nature. However the preferred embodiment is describe with respect to FDD radios. The method described here would fulfill of this disclosure, allowing a set of radios (BS and SS) to be controlled from the application layer so as to share radio resources that otherwise could not be shared. The method of this invention assumes that some key services from the lower layers in the radio/router are available at the application layer and they can include:
1. Transmitter Enable/Disable
2. Ability to select transmit Center Frequency, Bandwidth and Phy Mode
3. Queue control including:
   A. Ability to flush queue
   B. Prioritized queuing of control packets
   C. Queue status indicators
4. Receive signal strength indicator (RSSI)
5. Carrier lock indicator (CLI)

More advance capabilities could include: collision detection and/or media state monitoring (SNR, uncorrected errors, etc).

The preferred embodiment of one aspect of this invention uses two management components—cell managers (CM) 15, and subscriber managers (SM) 17. A cell manager 15 would be located with each BS 5, and subscriber manager 17 with each SS 9. If backbone latency and bandwidth are sufficient, a single cell manager 15 could control multiple cells. Support for multi-role and role switching systems could also be included. For instance, a ground radio might act as a SS 9 to an airborne BS radio, but also implement a BS service for other ground radios in its vicinity. Or a radio might act as a subscriber at one time, and then as a basestation (with back haul) at another. A multi-role manager (capable of both cell and subscriber manager functions) may be desirable in other configurations of the preferred embodiment.

Virtual CSMA

Carrier Sense of this invention requires that a radio listens to the media before attempting to transmit. This would require each SS 9 to listen to the uplink frequency and determine its occupancy. FDD radios do not have this capability since they generally only have the ability to transmit on the uplink frequency, NOT receive. What is possible is to implement a "virtual CSMA" (V-CSMA) by monitoring the uplink state at the CM 15, and broadcasting state information on the downlink. This is similar to the "Network Allocation Vector" (NAV) concept used in CSMA systems such as 802.11. The NAV is used to monitor use of the media that can't directly be observed by the radio.

CSMA often incorporates a concept call Collision Detection (CD). CD was used in old style Ethernet systems. The transmitters would both transmit and receive at the same time on the same channel. When another transmitter was heard, the first transmitter would recognize that a "collision" between two packets had occurred and cease transmission and enact protocols to retransmit the packet at a later time if appropriate. Recognizing that collisions were occurring and taking immediate action increase the efficiency of the protocol. As with CSMA, classical CD requires direct observation of the media. Thus classical CD also is not possible for the uplink of SS based when using FDD radios. However "Virtual CD" is also possible with the assistance of the CM 15 and can be incorporated as part of V-CSMA.

Collision Avoidance (CA) is another technique commonly applied with CSMA. CA is used in systems such as 802.11. It involves procedures such as waiting a random period of time between consecutive transmissions or retransmissions to allow fair access to the media and avoid collisions. CA does not require direct observation of the media, and is therefore possible with FDD radios.

In a version of the preferred embodiment of this invention performing V-CSMA it is assumes the CM 15 would monitor the network and perform the following functions:
1. Determine parameters of the backhaul network (if present)
2. Configure CM 15 per NM 11 (or use defaults/manual entry)
3. Determine capabilities of the local BS 5
4. Instantiate the downlink (DL)
5. Provide control and management (C&M) traffic on the DL
6. Process C&M traffic on the UL
7. Authenticate subscribers/users
8. Set up traffic relays as appropriate from the MMBN to the DL
9. Accept subscriber service requests
10. Allocate bandwidth grants to subscribers
11. Control other more advanced parameters The SM 17 would perform a complementary set of functions including:
1. Configure SM 17 per defaults or manual entry
2. Determine capabilities of the local SS 9
3. Acquire DL
4. Receive C&M traffic from the DL
5. Authenticate with the CM
6. Provide C&M traffic on the UL
7. Generate service requests as appropriate
8. Control uplink configuration and traffic based on grants from CM
9. Control other more advanced parameters While this version of the preferred embodiment only addresses CSMA, it should be recognized that the V-CSMA technique could be combined with other portions of other access methods (TDMA, CDMA, FDMA, DAMA, etc) in other configurations of the preferred embodiment. Other configuration of the preferred embodiment controlling radios from the application layer may use one or more other access methods instead of V-CSMA. A key "feature" of the configuration of the preferred embodiment using V-CSMA is that it utilizes a single uplink channel with asynchronous uplink access. It is specifically the virtual carrier sense access methods that are the focus of the V-CSMA configuration of the preferred embodiment, so other methods (such as authentication) will not be discussed. Standard methods from cellular networks could be used in other configurations.

Figure 2:
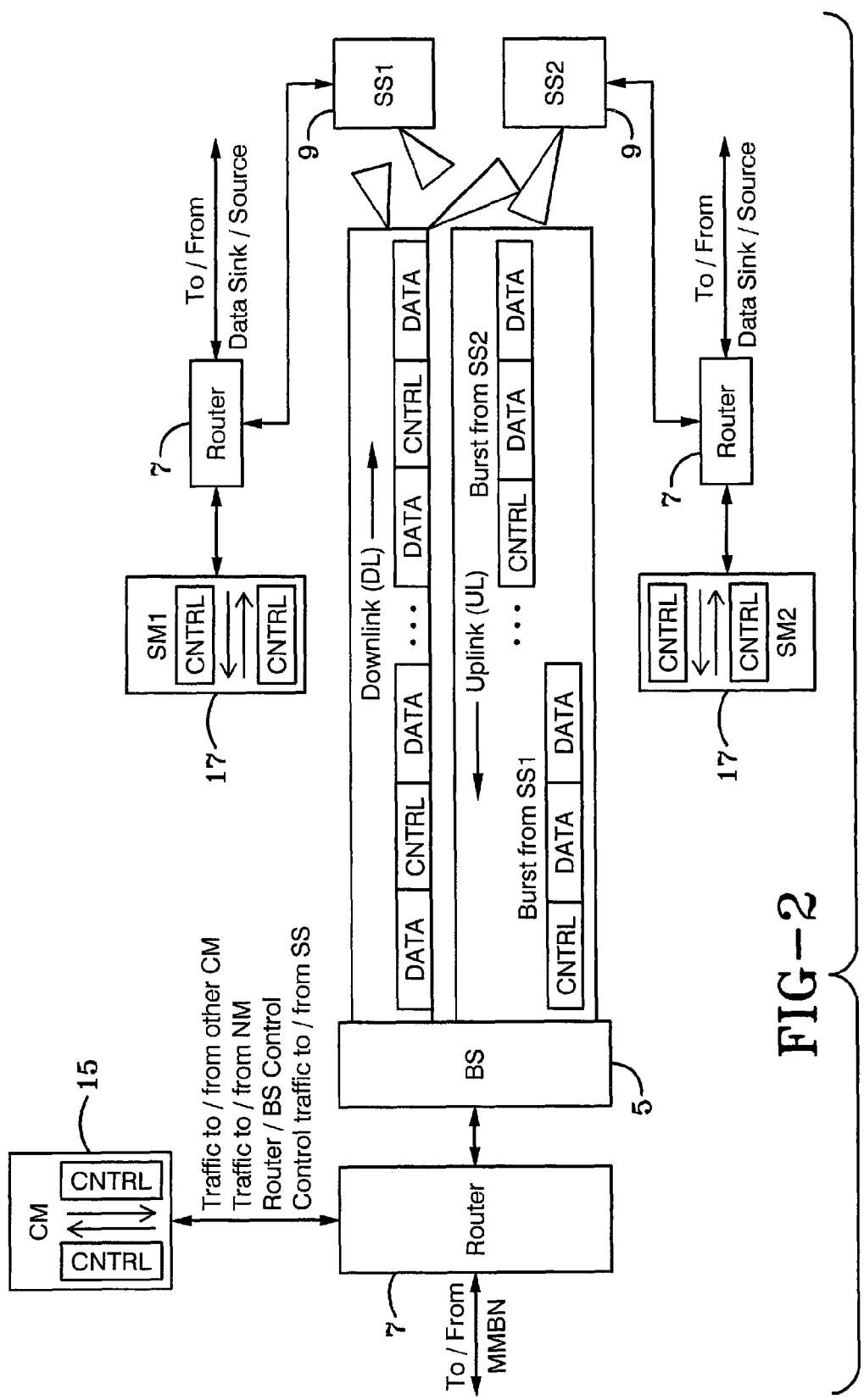
FIG. 2 illustrates a general overview of the communications for V-CSMA in the V-CSMA configuration of the preferred embodiment.

A general overview of the communications for V-CSMA is shown in FIG. 2. Components in this figure that have the same reference numbers as components in FIG. 1 are similar. This figure additionally illustrates a channel with a downlink (DL) and an uplink (UL). This configuration of the preferred embodiment uses prioritized queuing with V-CSMA control traffic given priority over other traffic being transmitted. It is assumed that traffic is held in the queues when the transmitter is not enabled. If a packet is partially transmitted when a transmitter is disabled, it is assumed lost. By holding traffic until it is know the radio is fully on, and putting a hold on the queues so no further traffic is sent before the radio is turned off, it can be assured that packets are not lost due to control of the radio transmitter. However, packets may still be lost to collisions on the media. Queues can be provided within the V-CSMA application software in which case all data traffic is first routed to the CM/SM, and then to the BS 5 or SS 9. Or queues with appropriate characteristics can be assumed to exist within the radio or router. The router might be integrated directly with the radio hardware and software.

In the protocol of this invention, the CM 15 monitors the traffic on the uplink. Based on uplink activity it would broadcast control parameters in control packets (CNTRL) on the DL. To minimize latency (critical to efficiency of the protocol) CNTRL packets would be sent with very high priority. CNTRL packets would be generated by the CM 15 at least once every 10 seconds, or upon a change of the access control parameters (to be described later). It will be recognized by those skilled in the art that the value of 10 seconds could be other values. Values as small as 1 millisecond and as large as 1 minute are contemplated with 10 seconds currently preferred.

Similarly, The SM 15 would monitor the DL for CNTRL packets. When CNTRL packets are detected they will be routed to the SM 15 and used to determine what behavior is required to access the UL. Whenever the SM 15 decides to transmit, it will enter an uplink CNTRL packet into the queue for transmission and then enable the transmitter. This should result in a multi-packet burst. Since the CNTRL packet has high priority (ideally the highest priority) it will be transmitted at the front of the burst. Other packets would follow. When the SM 15 disables the transmitter, the burst will end. Since the UL is shared, multiple users (2 are shown in the diagram) may generate bursts on the uplink. All the UL CNTRL packets will be sent to the CM 15 to facilitate control of the channel.

V-CSMA Protocols for the CM

The fundamental problem with CSMA for FDD is that SS radios 9 can't directly observe the uplink since they can't receive that frequency. Hence they can't detect when a carrier is present in the channel. However, the BS 5 radio will detect if a carrier is present, and can relay that information onto the downlink which the SS radios 9 can receive. In addition, the CM 15 can infer other factors such as how much longer the uplink will be occupied. All this is further complicated by the desire to control the radio from the application layer rather than as part of the radio software. The parameters used to sense channel occupancy in the radio are not as easily available at the application layer as within the radio software. So while the CM 15 can provide a digital representation of carrier sense to the SS 9 it includes inaccuracies and extrapolations—hence the term "virtual" carrier sense (V-CS).

Figure 3:
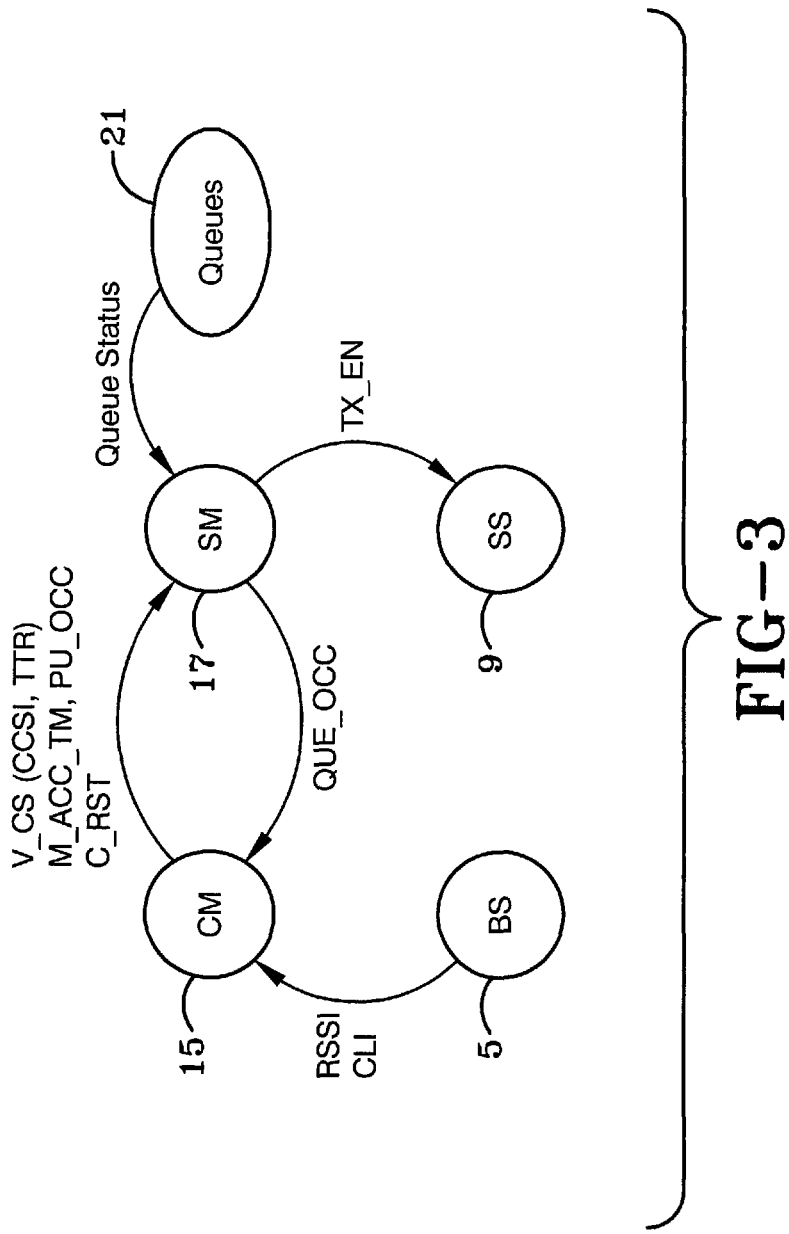
FIG. 3 illustrates example logical exchange of parameters that makes up the V-CSMA mechanism the V-CSMA configuration of the preferred embodiment.

FIG. 3 describes logical exchange of parameters that makes up the V-CSMA mechanism in this configuration of the preferred embodiment. To provide V-CS, the CM 15 periodically polls RSSI and carrier lock indicator (CLI) from the radios 9. Alternatively, if a 9 radio has the ability to provide interrupts on the occurrence of certain events, those interrupts can also be used as part of this configuration of the preferred embodiment. A Threshold would be set preferably set 10 dB above the radio noise floor based on calibration data. However estimation techniques could also be applied to determine the current noise floor for the radio within the spirit this configuration of the preferred embodiment. The value 10 is currently preferred, but values as small as 0, as high as 30 or other values are contemplated. If the threshold is exceeded, the uplink channel is assumed to be occupied. If CLI goes active, the channel is also assumed to be occupied. The CM 15 will maintain a variable Current Channel State Indicator (CCSI) which is the logical OR of these two conditions. CCSI is a binary variable which will normally be 0 when the channel is not physically occupied and 1 if the channel is occupied.

The CM will also maintain a set of parameters called V_CS. V_CS consists of two variables, the current channel state indicator (CCSI), and another parameter indicating how much longer the channel is expected to be occupied (to the nearest microsecond with a max range of at least 10 seconds). This parameter in V_CS is known as the time till release (TTR). If the channel is currently unoccupied, then TTR will indicate how long ago the channel was occupied. TTR will be inferred by the CM 15 based on UL channel parameters and QUE_OCC. If QUE_OCC is not known, TTR will be inferred based on the maximum access time. This will be indicated as a negative value with same range and resolution as for positive values. V_CS will be included in each DL CNTRL packet along with the parameters described below.

In addition to V_CS, the CM will transmit a parameter called Maximum Access Time (M_ACC_TM) on the downlink to the SM. M_ACC_TM should be set based on typical physical layer data rates, desired performance, SM 15 capabilities, and the number of active users. A typical value of M_ACC_TM would be 10 milliseconds. However times as small as 1 microsecond, as large as a minute or other values can be used.

The CM 15 will also generate a parameter called per user occupancy (PU_OCC). PU_OCC determines how frequently an SM 17 can contend for the medium. It allows the CM 15 to control a collision avoidance algorithm running in the SM 17. The CM 15 always assumes at least 2 radios 9 are contending. It assumes additional contenders (in addition to the two default contenders) for each SM 17 with a non-zero queue. The CM 15 will determine the value of PU_OCC based on the current number of contenders (N_CNTDR). A target occupancy (TRGT_OCC) of 0.5 (50%) is suggested. However other values (0-100%) can also be used and targets may depend on radio specifics and desired levels of quality of service and channel efficiency. The PU_OCC can then be set based on a simple equation:

$$PU\_OCC = TRGT\_OCC/N\_CNTDR$$

The CM 15 can also infer collisions based on unexpected loss of CLI, and/or unexpected changes in RSSI. If the radio provides an interface to indicate link errors this can also be used to indicate collisions. Note that it is not necessarily of great utility to indicate collisions to the SS 9, and it is believed it should be acceptable to omit this function in some configurations of the preferred embodiment. It is assumed that higher layer protocols inside or outside the radio such as transmission control protocol (TCP) can provide robustness against collisions, and other issues. However, if the uplink is not functioning well, and it is possible to clear the uplink in a reasonable time (effectively reset it) and this can be accomplished using the following parameter. The contention reset (C_RST) parameter is transmitted to the SS 9. When it is set to 1 it indicates that SS 9 should immediate disable their transmitters and reset their contention process. If it set to 0, then this binary parameter would have no effect.

V-CSMA Protocols for the SM 17

The SM 17 starts by listening to the downlink. The parameters in the most recent CTRL packet received are used to control the channel access process. Once a full set of parameters is received the SM 17 may contend for access. The SM 17 will poll for queue status from the queue 21. If the queue 21 is not empty, it will contend for the UL.

To contend, the SM 17 first checks the V_CS parameters to see if the channel is occupied. It will do so based on the time the last CTRL packet was received, and the value of TTR. The SM 17 will also maintain a local variable (LST_TM_OCC) indicating the last time the media was occupied. If currently occupied, the SM 17 will set a flag (CNTND) that it must contend for the medium. If not occupied, the SM 17 will check if CNTND is set. If not, the SM 17 will check when its last transmission ended (LST_TX_END). The SM 17 will check the current time (CRNT_TM). It will then check if:

$$CRNT\_TM > (M\_ACC\_TM/PU\_OCC) + LST\_TX\_END$$

If CRNT_TM satisfies this equation, then the SM can immediately transmit. Otherwise it will set the CNTND flag.

If the Channel is unoccupied and CNTND is set, the SM will initiate a contention procedure. It will select a 16 bit random back off (RBO) and determine back off time (BO_TM) according to:

BO_TM=RBO*M_ACC_TM/PU_OCC

It will then compute a back off complete time (BC_CMP_TM) as:

BC_CMP_TM=LST_TM_OCC+BO_TM

The SM 17 will regularly check if (CRNT_TM>BC_CMP_TM). Once this is true, the SM 17 will reset CNTND. It will then repeat the process of check for immediate transmission and if it must contend again. It will repeat the process indefinitely until it is permitted to transmit.

Once permitted to transmit, SM 17 will load a CNTRL packet in the queue indicating the backlog in its queue (in bytes) as off the start of the burst. A 32 bit value shall be used to indicate the queue size with 0 indicating an unknown queue size, and all ones indicating "at least" the value indicated. The SM 17 will set the parameter to enable transmission (TX_EN=1). The SM 17 will note when the current burst time starts, and monitor the time on the channel. Once M_ACC_TM is reached the SM 17 will set TX_EN=0. It may also control the traffic in and out of the queue to make sure no packets are in transmission when turning off the transmitter.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
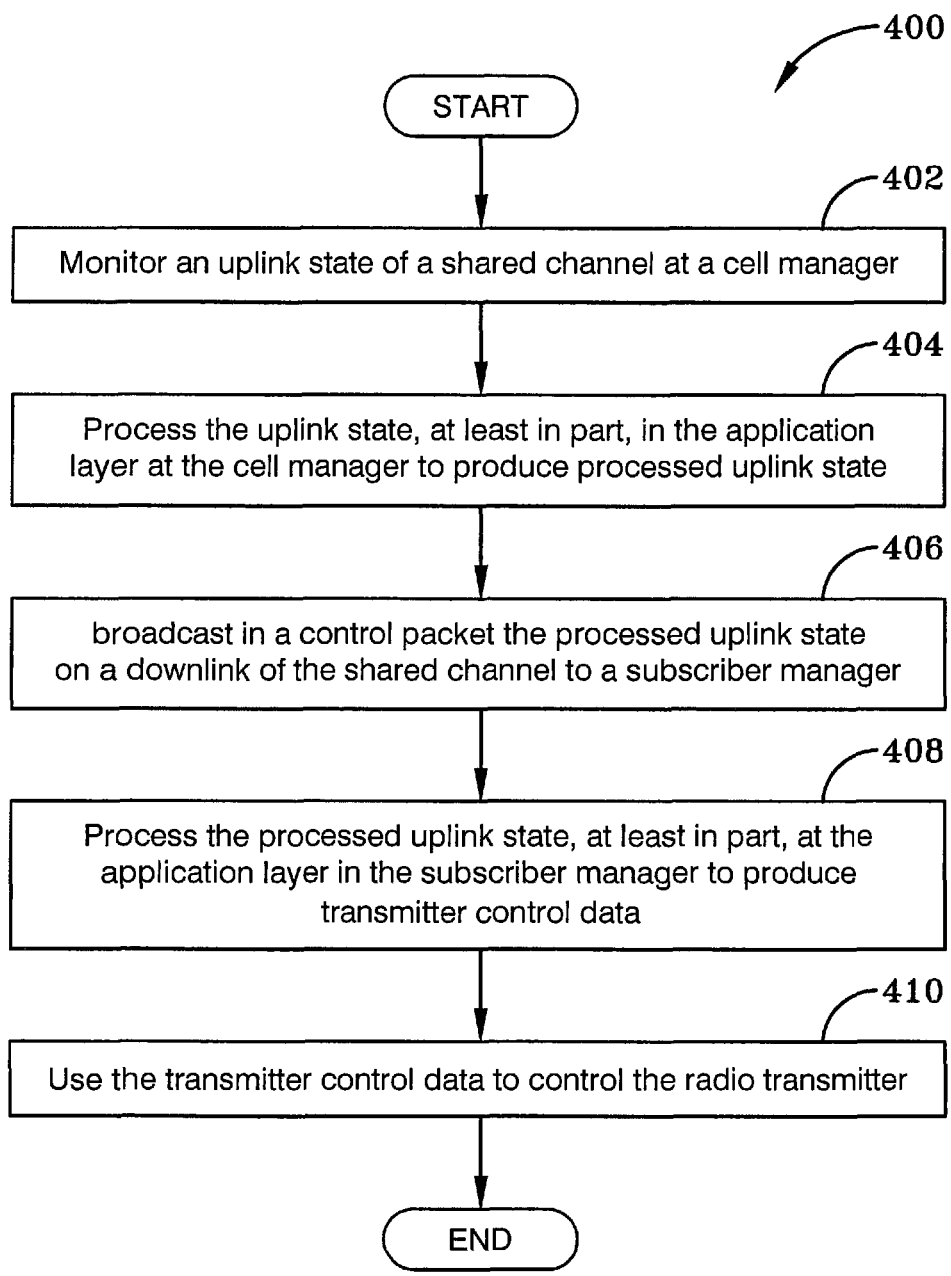
FIG. 4 illustrates

FIG. 4 illustrates a method 400 for controlling a radio transmitter from the application layer. The method 400 includes monitoring, at 402, an uplink state of a shared channel at a cell manager. The cell manager processes the uplink state, at 404, in the application layer in the cell manager to produce processed uplink state. The processed uplink state is then broadcast, at 406, in a control packet on a downlink of the shared channel to a subscriber manager. The processed uplink state is next further processed, at 408, at the application layer in the subscriber manager to produce transmitter control data. The transmitter control data is then used control the radio transmitter, at 410. As mentioned above, this method 400 provides for controlling radios from the application layer as to share radio resources that otherwise could not be shared. The method 400 assumes key parameters and controls from the lower layers of the radio and router are available at the application layer. As mentioned earlier sensing the uplink channel state in the cell manager and processing there before sending it on the downlink to the subscriber managers allows the subscriber radio that may only have FDD capability to be control so that its transmitter does not unnecessarily interfere with the shared channel. For example, the cell manager and the subscriber manager can implement a Virtual CSMA protocol as discussed earlier.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of controlling a subscriber station (SS) radio at the application layer of an Open Systems Interconnection (OSI) 7-layer model of the International Organization for Standardization (IOS) comprising the steps of:
   providing, to logic operating in the application layer, parameters associated with a shared channel to be shared with a other radios; and
   based, at least in part, on the application layer parameters, controlling from the application layer when the SS radio is to transmit on the shared channel;
   communicating the SS radio with a base station (BS) radio;
   implementing a virtual carrier sense multiple access (V-CSMA) protocol at least in part by:
   polling the BS radio with a cell manager to receive at least one of the group of: a receive signal strength indicator (RSSI) and a carrier lock indicator (CLI) from the SS radio;
   determining if the shared channel is available based, at least in part, on the RSSI and the CLI; and
   transmitting whether the shared channel is available on a downlink to the SS radio;
   wherein the step of implementing the V-CSMA protocol further includes the steps of:
   calculating at the cell manager at least partially in the application layer virtual-carrier sense (V_CS) parameters that include at least a current channel state indicator (CSSI) and a time till release (TTR) parameter, wherein the TTR parameter indicates how much longer the shared channel is expected to be occupied and if unoccupied then how long ago the shared channel was occupied; and
   providing the V_CS parameters to a subscriber manager that uses the V_CS parameters to determine when the SS radio can transmit;
   using at the subscriber manager at least partially in the application layer a most recently received set of V_CS parameters to content for channel access including:
   polling a queue for a queue status;
   when the queue is not empty, using the V_CS parameters to determine if the shared channel is occupied;
   when the shared channel is occupied, setting a contend (CNTND) flag to indicate that the subscriber manager is contending for the shared channel; and
   when the shared channel is occupied, determining how long ago a previous transmission was sent to determine if the SS radio can transmit;
   wherein the determining how long ago a previous transmission was sent further comprises:

receiving at the subscriber manager a maximum access time (M_ACC_TM) from the cell manager that indicates the maximum access time that the shared channel can be used by the SS radio during one transmission;

receiving at the subscriber manager a per user occupancy (PU_OCC) that determines how frequently the subscriber manager can contend for the shared channel;

receiving at the subscriber manager a last transmission end time (LST_TX_END) and determining at the application layer if current time (CRNT_TM)>(M_ACC_TM/PU_OCC)+LST_TX_END;

and if CRNT_TM>(M_ACC_TM/PU_OCC)+LST_TX_END then enable the SS radio to turn on its transmit and begin transmission otherwise set the CNTND flag.

2. The method of controlling an SS radio from the application layer of claim 1 wherein the step of providing to the logic operating in the application layer parameters associated with a shared channel further comprises:

providing to the logic operating in the application layer associated with a base station (BS) at least one of the group of: a carrier lock indicator (CLI) value, a receive signal strength indicator (RSSI) value, a collision detection value, a signal to noise ratio (SNR) value of a media, an uncorrected error value of the media and a transmitter enable value; and using one or more of the CLI, RSSI value, collision detection value, SNR value, uncorrected error value and the transmitter enable value at the logic operating in the application layer associated with the base station to derive control parameters for one or more SS radios.

3. The method of controlling an SS radio from the application layer of claim 1 further comprising:

controlling the SS radio from the application layer according to a carrier sense multiple access (CSMA) protocol.

4. The method of controlling an SS radio from the application layer of claim 1 wherein the SS radio is a frequency domain duplexed (FDD) radio that does not have an ability to receive on an uplink and further comprising:

controlling the SS radio from the application layer according to a virtual carrier sense multiple access (V-CSMA) protocol and further comprising:

monitoring with a cell manager an uplink that the SS radio transmits on to determine if the uplink is active;

forwarding on a down link from the cell manager through a base station (BS) to the SS radio an indication if the uplink is active; and determining whether to transmit from the SS radio on the uplink based, at least in part, on the indication if the uplink is active.

5. The method of controlling an SS radio from the application layer of claim 1 wherein the implementing the V-CSMA protocol further comprises:

calculating at the cell manager a maximum access time (M_ACC_TM) value that indicated the maximum access time that the shared channel can be used by the SS radio during one transmission; and providing the M_ACC_TM on the downlink to the subscriber manager.

6. The method of controlling an SS radio from the application layer of claim 5 wherein value of the M_ACC_TM is about 10 milliseconds.

7. The method of controlling an SS radio from the application layer of claim 1 wherein the implementing the V-CSMA protocol further comprises:

determining at least partially at the application layer a per user occupancy (PU_OCC) that determines how frequently the subscriber manager can contend for the shared channel; and providing the PU_OCC to a subscriber manager, wherein the subscriber managers contents for the shared channel based, at least in part on the PU_OCC.

8. The method of controlling an SS radio from the application layer of claim 7 wherein N_CNTDR is a current number of contenders and TRGT_OCC is a target occupancy of the shared channel and further comprising:

determining at the cell manager in the application layer the PU_OCC at least partially according to:

$$PU\_OCC = TRGT\_OCC/N\_CNTDR.$$

9. The method of controlling an SS radio from the application layer of claim 1 further comprising:

sending the V_CS parameters on a downlink of the shared channel from the cell manager to the subscriber manager.

10. The method of controlling an SS radio from the application layer of claim 9 wherein the sending the V_CS parameters further comprises:

sending the V_CS parameters in a control (CNTRL) packet that has a higher priority than a data packet.

11. The method of controlling an SS radio from the application layer of claim 1 further comprising:

when shared channel is unoccupied and the CNTND flag is set, using a random backup number (RBO) to calculate at the application layer in the subscriber manager a back off time (BO_TM) according to equation: BO_TM=RBO*M_ACC_TM/PU_OCC and calculating a back off complete time (BO_CMP_TM) according to the equation: BC_BMP_TM=LST_TM_OCC+BO_TM; and when CRNT_TM>BC_CMP_TM reset the CNTND flag and permit the SS radio to attempt to transmit a message.

12. The method of controlling an SS radio from the application layer of claim 1 further comprising:

providing through the application layer at least one of the group of: the ability to flush a queue, the ability to prioritize control packets in the queue, the ability to read queue status indicators, the ability to select a transmit carrier frequency, the ability to select a bandwidth and the ability to select a PHY mode.

13. The method of controlling an SS radio from the application layer of claim 1 wherein the controlling from the application layer when the SS radio is to access the shared channel further comprises:

determining in the application layer when to turn on a transmitter of the SS radio.

14. A radio system comprising:

a first radio that is base station (BS);

a subscriber station (SS) radio with a transmitter;

a cell manager configured to operate in the application layer of an Open Systems Interconnection (OSI) 7-layer model and to provide control and management (C&M) on a downlink (DL);

a subscriber manager configured to operate in the application layer and configured to determine capabilities of the SS radio, acquire the DL, receive C&M messages on the DL, to provide C&M traffic on an uplink (UL) of the shared channel, and calculate a back off time for the SS to send UL traffic; and a router configured to route all data to the subscriber manager before any data is routed to the SS radio for transmission, wherein the subscriber manager is configured to determine, at least in part, at the application layer when to turn on the transmitter in the SS radio for the transmission of data including:
receiving at the subscriber manager a maximum access time (M_ACC_TM) from the cell manager that indicates the maximum access time that the shared channel can be used by the SS radio during one transmission;
receiving at the subscriber manager a per user occupancy (PU_OCC) that determines how frequently the subscriber manager can contend for the shared channel;
receiving at the subscriber manager a last transmission end time (LST_TX_END) and determining at the application layer if current time (CRNT_TM)>(M_ACC_TM/PU_OCC)+LST_TX_END;
and if CRNT_TM>(M_ACC_TM/PU_OCC)+LST_TX_END then enable the SS radio to turn on its transmit and begin transmission.

15. The radio system of claim 14 wherein the SS radio is a frequency domain duplex (FDD) radio that cannot listen to the uplink, wherein the cell manager and the subscriber manager are configured to exchange parameters about signal activity on the uplink and are configured to determine at the application layer using a version of a carrier sense multiple access (V-CSMA) protocol to control when the SS radio may turn on the transmitter based, at least in part on the signal activity.

16. The radio system of claim 14, further comprising:
a random backup number (RBO) to calculate the back off time at the application layer in the subscriber manager.

17. The radio system of claim 16, wherein the subscription manager is further configured to initiate a contention procedure.

18. A method of controlling a radio transmitter from the application layer of an Open Systems Interconnection (OSI) 7-layer model comprising:
monitoring an uplink state of a shared channel at a cell manager;
processing the uplink state, at least in part, in the application layer at the cell manager to produce processed uplink state;
broadcasting, in a control packet, the processed uplink state on a downlink of the shared channel to a subscriber manager, wherein the control packet includes a maximum access time (M_ACC_TM) that the shared channel can be used by the radio transmitter during one transmission, a per user occupancy (PU_OCC) that determines how frequently the subscriber manager can contend for the shared channel and a last transmission end time (LST_TX_END);
processing the processed uplink state, at least in part, at the application layer in the subscriber manager to determine if current time (CRNT_TM)>(M_ACC_TM/PU_OCC)+LST_TX_END and if CRNT_TM>(M_ACC_TM/PU_OCC)+LST_TX_END then produce transmitter control data;
calculating a back off time in the subscriber manager for a subscriber station to send uplink traffic; and
using the transmitter control data to control the radio transmitter.

19. The method of controlling a radio transmitter from the application layer of claim 18 wherein the step of calculating the back off time for the SS to send uplink traffic is accomplished, at least part, by using a random backup number (RBO) to calculate the back off time.

20. The method of controlling a radio transmitter from the application layer of claim 19, further comprising the step of initiating a contention procedure.

* * * * *